United States Patent
Aitchison

(12) 
(10) Patent No.: US 9,652,473 B2
(45) Date of Patent: May 16, 2017

(54) CORRELATING SOCIAL MEDIA DATA WITH LOCATION INFORMATION

(71) Applicant: Adobe Systems Incorporated, San Jose, CA (US)

(72) Inventor: Cory W. Aitchison, Orem, UT (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

(21) Appl. No.: 13/750,843

(22) Filed: Jan. 25, 2013

(65) Prior Publication Data

US 2014/0214819 A1   Jul. 31, 2014

(51) Int. Cl.
*G06F 17/30* (2006.01)

(52) U.S. Cl.
CPC .... *G06F 17/30241* (2013.01); *G06F 17/3087* (2013.01); *G06F 17/30867* (2013.01)

(58) Field of Classification Search
CPC ................................................ G06F 17/30241
See application file for complete search history.

(56) References Cited

U.S. PATENT DOCUMENTS

| | | | | |
|---|---|---|---|---|
| 6,343,317 | B1* | 1/2002 | Glorikian | 709/218 |
| 7,917,154 | B2* | 3/2011 | Fortescue et al. | 455/456.1 |
| 8,060,582 | B2* | 11/2011 | Bliss et al. | 709/218 |
| 8,438,156 | B2* | 5/2013 | Redstone et al. | 707/724 |
| 8,655,873 | B2* | 2/2014 | Mitchell et al. | 707/724 |
| 2002/0046259 | A1* | 4/2002 | Glorikian | 709/218 |
| 2004/0078750 | A1 | 4/2004 | Frank | |
| 2008/0059455 | A1* | 3/2008 | Canoy et al. | 707/5 |
| 2008/0104227 | A1* | 5/2008 | Birnie et al. | 709/224 |
| 2009/0319331 | A1* | 12/2009 | Duffy et al. | 705/10 |
| 2011/0264654 | A1* | 10/2011 | Wolosin et al. | 707/724 |
| 2011/0307478 | A1* | 12/2011 | Pinckney et al. | 707/724 |
| 2012/0059812 | A1* | 3/2012 | Bliss et al. | 707/706 |
| 2012/0069131 | A1* | 3/2012 | Abelow | 348/14.01 |
| 2012/0233158 | A1* | 9/2012 | Braginsky et al. | 707/724 |
| 2013/0073336 | A1* | 3/2013 | Heath | G06Q 30/02 705/7.29 |
| 2013/0085803 | A1* | 4/2013 | Mauro et al. | 705/7.29 |
| 2013/0097162 | A1* | 4/2013 | Corcoran et al. | 707/724 |
| 2013/0159295 | A1* | 6/2013 | Gross | 707/724 |
| 2013/0191361 | A1* | 7/2013 | Yu et al. | 707/706 |
| 2013/0218880 | A1* | 8/2013 | McConnell et al. | 707/724 |
| 2013/0238658 | A1* | 9/2013 | Burris | 707/770 |
| 2013/0268558 | A1* | 10/2013 | Burris | 707/770 |

(Continued)

OTHER PUBLICATIONS

"More Than Social Media Management", on Dec. 3, 2012, Retrieved from <http://marketmesuite.com/> on Dec. 3, 2012, 3 pages.

*Primary Examiner* — Taelor Kim
(74) *Attorney, Agent, or Firm* — Wolfe-SBMC

(57) ABSTRACT

Techniques for correlating social media data with location information are described. In at least some embodiments, social media data is gathered from a social media platform, and the social media data is processed to determine correlations between topic information from the social media data and locations. The correlations can be aggregated to generate a database of social media information. The database can be searchable with various search terms to determine interest levels at different locations for topics associated with the social media data. Results of such a search can be provided in a variety of ways, such as via maps, tables, and so on.

20 Claims, 11 Drawing Sheets

(56) References Cited

U.S. PATENT DOCUMENTS

2013/0304828 A1* 11/2013 Robertson et al. ............ 709/206
2014/0025670 A1*  1/2014 Daran et al. ................... 707/724
2014/0089124 A1*  3/2014 Jha et al. ...................... 705/26.3
2014/0089343 A1*  3/2014 Burris et al. .................. 707/770
2014/0164368 A1*  6/2014 Mitchell et al. ............... 707/724

* cited by examiner

| Term | Location | Hits | Sentiment |
|---|---|---|---|
| ski | Salt Lake City UT | 1,116 | Pos (68%), Neut (24%), Neg (8%) |
| brand X | Salt Lake City UT | 141 | Pos (51%), Neut (45%), Neg (4%) |
| ski + brand X | Salt Lake City UT | 42 | Pos (51%), Neut (45%), Neg (4%) |
| ski | Provo UT | 315 | Pos (74%), Neut (21%), Neg (5%) |
| brand X | Provo UT | 27 | Pos (44%), Neut (54%), Neg (2%) |
| ski + brand X | Provo UT | 7 | Pos (44%), Neut (54%), Neg (2%) |
| ... | ... | ... | ... |

_(1)_

CORRELATING SOCIAL MEDIA DATA WITH LOCATION INFORMATION

BACKGROUND

Marketers today use a variety of different types of information to target advertising. For instance, data gathered from marketing surveys can indicate interest in a particular product in a particular geographical region and/or demographic. As a further example, sales volume of a product in a particular geographic region can indicate interest and/or lack of interest for the product in the geographical region. While such information can be helpful in determining regions in which to focus marketing campaigns, such information can be expensive to gather and may provide an imprecise picture of product interest in particular regions.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for correlating social media data with location information are described. In at least some embodiments, social media data is processed to associate topic information from the social media data with locations. Correlations between social media data and locations can be aggregated to generate a database, which can be searchable with various search terms to determine interest levels at different locations for topics associated with the search terms. Results of such a search can be provided in a variety of ways, such as via a map of a particular location (e.g., geographic region) with indications of interest in certain topics overlaid on the map, text-based output, and so forth. In at least some embodiments, social media data can be monitored for various criteria, such as occurrences of keywords, sentiment information, location information, and so forth. Occurrences of such criteria can generate alerts that can be provided to users.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
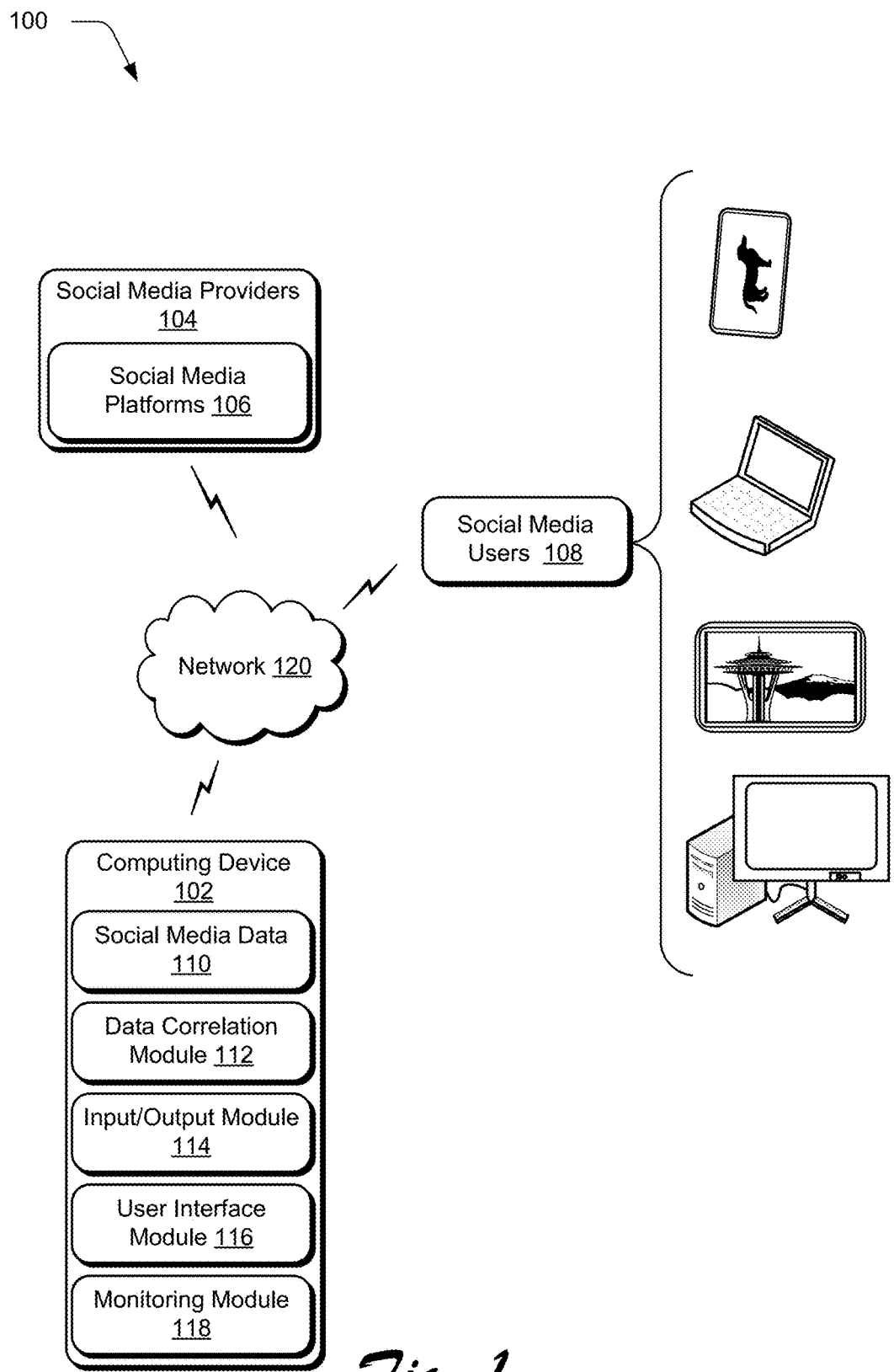
FIG. 1 is an illustration of an environment in an example implementation that is operable to employ techniques discussed herein in accordance with one or more embodiments.

Techniques for correlating social media data with location information are described. In at least some embodiments, social media data is gathered from a social media platform, such as from a website that enables users to interact with one another. Such platforms typically provide functionality for users to post comments and content (e.g., photos, video, audio, and so forth) for other users to access. Thus, social media data that is gathered can include text, as well as other types of data, such as content, metadata, and so on.

Social media data may also be associated with location information. For instance, a user can post a comment that identifies a particular location, such as "Having drinks at the Splash Wine Bar in San Diego—cool place!" Thus, location information can be extracted from the post via textual analysis to identify "San Diego" and "Splash Wine Bar." Location information may be gathered in other ways as well. For instance, location information for a device that is used to post social media data can be gathered. A mobile device that uploads social media data, for instance, may also include position information with the data. Such position information can include Global Positioning System (GPS) coordinates for the device's location, latitude/longitude values, and so forth. A user may also specify location information, such as by tagging a particular location along with posting social media data. Thus, location information may be gathered in a variety of different ways.

In various embodiments, social media data is processed to associate topic information from the social media data with locations. For instance, keywords identified from the social media data can be correlated to location information ascertained from the social media data to determine interest in various topics at corresponding locations. With reference to the example post above, the keyword "drinks" can be associated with the locations "Splash Wine Bar" and "San Diego." Thus, the areas of "Splash Wine Bar" and "San Diego" can be determined to be locations at which there is some interest in the topic of "drinks" As detailed further below, sentiment information may also be considered, such as to determine favorable or unfavorable user opinion concerning various topics in certain locations.

Correlations between social media data and locations can be aggregated to generate a database of social media information. The database can be searchable with various search terms to determine interest levels at different locations for topics associated with the search terms. For example, a user can initiate a search with a particular search term (e.g., relating to a specific topic), and may optionally specify a location and/or locations for targeting the search.

Results of such a search can be provided in a variety of ways. For example, a map of a particular location (e.g., geographic region) can be output, with indications of interest in certain topics overlaid on the map. Alternatively or additionally, a text-based output (e.g., a table) can be provided that correlates various topics with locations. Search results may also include sentiment information, such as indicating favorable or unfavorable user sentiment for a topic at a particular location. Thus, embodiments discussed herein provide ways for correlating a wide variety of different types of social media data with location information. Such correlations may be employed for a variety of purposes, such as for gauging user interest for targeting advertising, marketing, sales projections, political campaigning, and so forth.

In at least some embodiments, social media data can be monitored for various criteria, such as occurrences of keywords, sentiment information, location information, and so forth. When various monitoring criteria are detected, alerts can be generated. For instance, a user can be notified that certain criteria have been detected in social media data, such as a particular keyword or phrase associated with a location. Monitoring of social media data can be configured (e.g., by a user) to monitor a variety of different types and forms of social media data.

In the following discussion, an example environment is first described that is operable to employ techniques described herein. Next, a section entitled "Example Implementation Scenarios" describes some implementation scenarios involving techniques discussed herein which may be employed in the example environment as well as in other environments. Following this, a section entitled "Social Media Monitoring" describes some example embodiments for monitoring social media data in accordance with one or more embodiments. Finally, a section entitled "Example System and Device" describes an example system and device that are operable to employ techniques discussed herein in accordance with one or more embodiments.

Example Environment

FIG. 1 is an illustration of an environment 100 in an example implementation that is operable to employ techniques for correlating social media data with location information. Environment 100 includes a computing device 102 which can be configured in a variety of ways, examples of which are described below in FIG. 11.

The environment 100 further includes social media providers 104, which are representative of various enterprises and/or services that provide social media platforms 106 via which different users may interact and communicate. For instance, the social media platforms 106 can include web-based portals for social interaction. At least some of the social media platforms 106, for instance, can include web pages that enable users to view and post content.

Social media users 108 are illustrated, which are representative of users which may interact via the social media platforms 106. For instance, the social media users 108 may create accounts with the different social media platforms 106. Utilizing the accounts, the social media users 108 can post various types of content to the social media platforms 106, such as text content (e.g., messages), photographs, video, audio, and so on. The social media users 108 can also utilize the social media platforms 106 to rate various content and/or entities, such as by indicating a preference (e.g., "liking") for a particular instance of content.

Further to embodiments discussed herein, the computing device 102 can retrieve social media data 110 from the social media providers 104. The social media data 110 can include various types of data, such as content posted to the social media platforms 106, geographic region identifiers associated with posted content, keywords extracted from posted content, keywords provided by users in advance, and so on.

For instance, consider that one of the social media users 108 posts a comment via a smartphone to one of the social media platforms 106. The comment identifies (e.g., tags) a particular restaurant, and includes the phrase "Food here is excellent!" The social media data 110 extracted from the comment can include a name for the restaurant, geographic information for the restaurant (e.g., GPS coordinates), keywords extracted from the comment (e.g., "food," "excellent"), and so forth. As detailed elsewhere herein, the social media data 110 can be leveraged to determine location-based information for various products, services, entities, and so on.

The computing device 102 includes various functionalities for managing and processing the social media data 110. For instance, a data correlation module 112 is included, which is representative of functionality to process the social media data 110 and identify various attributes of the social media data. For instance, the data correlation module 112 can parse the social media data 110 to identify keywords, geographical information (e.g., geographical coordinates for posts), sentiment information (e.g., likes/dislikes associated with different content and/or entities), and so on.

The data correlation module 112 may also be leveraged to correlate aspects of the social media data 110 with various geographical regions. For instance, keywords from a post that is determined to originate from a particular geographical region can be correlated with the geographical region. Correlation of keywords with geographical regions can indicate interest in particular topics for the geographical regions, such as content, products, services, and so on.

The computing device 102 further includes an input/output (I/O) module 114, which is representative of functionality to receive various types of input and provide various types of output. For instance, the I/O module 114 can receive user input to interact with the social media data 110, such as to search for correlations between different keywords and geographical regions. The I/O module 114 can also output indications of such correlations, such as via a graphical user interface.

A user interface module 116 is further included, which is representative of functionality to manage various aspects of graphical user interfaces discussed herein. For instance, the user interface module 116 can cause processed social media data 110 to be displayed via the computing device 102. The user interface module 116 may also provide interactive interfaces via which a user can provide input and/or navigate (e.g., search) the social media data 110.

The computing device 102 further includes a monitoring module 118, which is representative of functionality to monitor social media data for various criteria. As detailed elsewhere herein, social media data can be monitored for various criteria, and alerts can be generated upon the occurrence of specified criteria.

The environment 100 further includes one or more networks 120 via which various entities of the environment 100 may communicate. The network(s) 120 may assume a variety of different configurations, such as a local area network (LAN), a wide area network (WAN), the Internet, and so on. Further, although the various entities of the environment 100 are illustrated as discrete devices, this is not intended to be limiting. For instance, functionalities discussed with reference to the environment 100 and/or other portions of the discussion herein may be implemented in a distributed environment (e.g., "over the cloud"), as further described in relation to FIG. 11.

Having described an example environment in which the techniques described herein may operate, consider now a discussion of some example implementation scenarios in accordance with one or more embodiments.

Example Implementation Scenarios

The following discussion describes example implementation scenarios for correlating social media data with location information in accordance with one or more embodiments. The implementation scenarios may be employed in the environment 100 of FIG. 1, the system 1100 of FIG. 11, and/or any other suitable environment.

Figure 2:
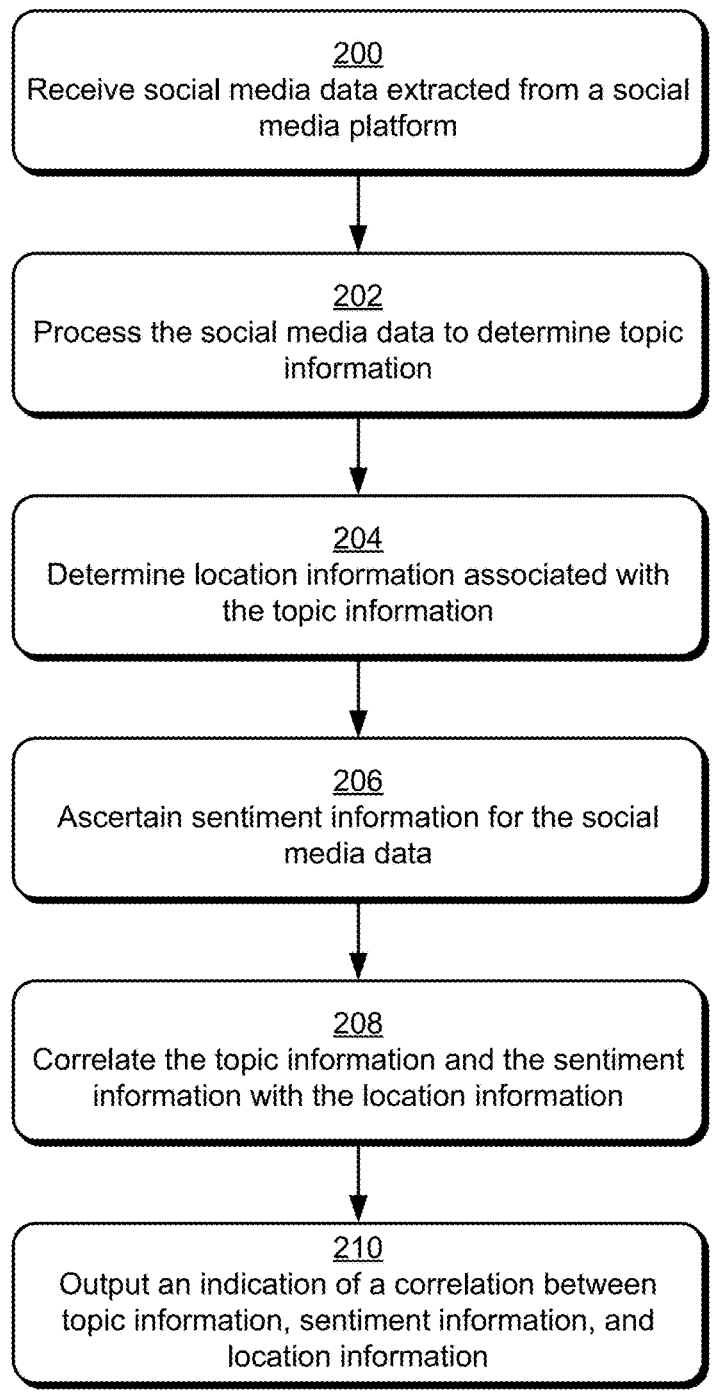
FIG. 2 is a flow diagram that describes steps in a method in accordance with one or more embodiments.

FIG. 2 is a flow diagram that describes steps in a method in accordance with one or more embodiments. Step 200 receives social media data extracted from a social media platform. For instance, social media data can be pushed from a social media platform to a separate entity, as discussed above. Additionally or alternatively, the social media data can be pulled from a social media platform, such as by the computing device 102 from the social media platforms 106 via the network 118.

Step 202 processes the social media data to determine topic information. For instance, content included in the social media data can be parsed for various information, such as keywords, content identifiers (e.g., metadata included in content), and so forth. As referenced above, keywords can include identifiers for various products (e.g., "skis"), product brands, service identifiers, names for public figures (e.g., politicians, actors, musicians, and so on), events (e.g., holidays, concerts, and so on), and various other topics that may be discussed and/or posted via social media.

Step 204 determines location information associated with the topic information. For example, geographical coordinates can be determined for posts, such as a location at which a user was present when they posted to a social media platform. Location information may also be determined based on keywords, such as identifiers for locations included in social media data. For instance, a user may tag a location (e.g., a restaurant, a store, an event facility, and so on), and may provide comments regarding the location. A user may also explicitly identify a particular location, such as in text provided as part of a post.

Step 206 ascertains sentiment information for the social media data. Sentiment information refers generally to an indication of user attitude toward a particular topic, such as user interest or lack of interest in a topic. For example, sentiment information can indicate that a user likes, is indifferent to, or dislikes a particular topic. Further, different levels of sentiment can be detected, such as strongly like, somewhat like, strongly dislike, and so on.

Sentiment information can be determined based on various information included in social media data, such as keywords included in a post, indications that a user "likes" a particular topic (e.g., via user selection of a rating functionality), natural language processing, and so on. For instance, a user can post a comment to a social media platform stating "Shopping at Music Emporium, great selection of guitars!" Parsing this comment indicates not only location information ("Music Emporium") and topic information ("guitars"), but also indicates sentiment information in the term "great." Thus, such a post can be associated with a positive sentiment, e.g., that a user likes Music Emporium and guitars.

Step 208 correlates the topic information and the sentiment information with the location information. For instance, keywords and sentiment information from a particular post can be correlated with geographic information for the post. As discussed elsewhere herein, correlations between topic information, sentiment information, and geographical region can be stored as a database that can be searched with particular keywords and/or geographical regions to determine geographical correlations to keywords, e.g., regions in which interest has been indicated for particular topics.

Step 210 outputs an indication of a correlation between topic information, sentiment information, and location information. For instance, a map of a particular geographic region can be output, with indications of keywords and sentiment for the topics graphically associated with corresponding geographic regions. Alternatively or additionally, other types of indicia can be output, such as a table with correlations between geographical regions and sentiment for particular topics.

In at least some implementations, the process discussed above can be performed "on demand," such as in response to a query for correlation between a particular topic and geographical regions. Alternatively or additionally, the process can be performed to generate a database of such correlations that can be subsequently searched.

Figure 3:
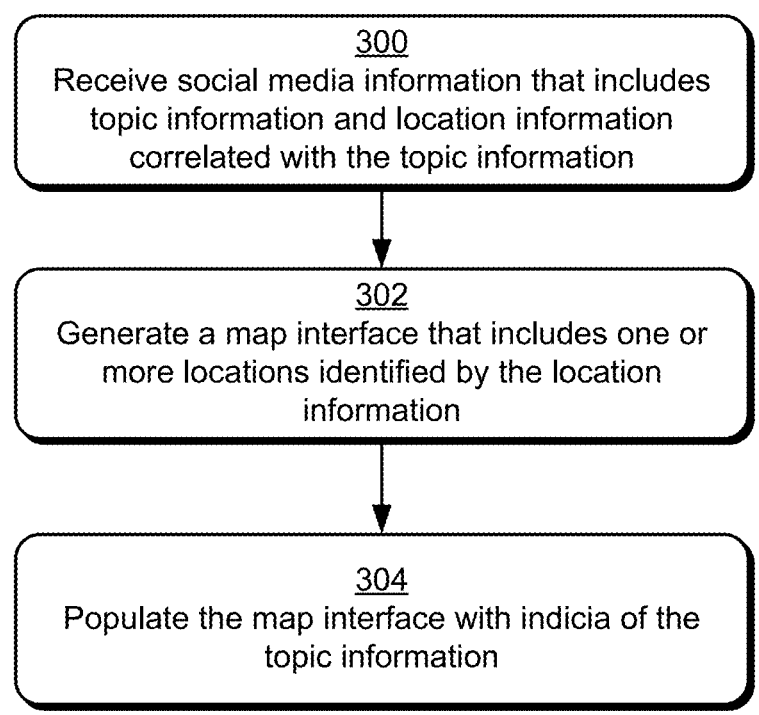
FIG. 3 is a flow diagram that describes steps in a method in accordance with one or more embodiments.

FIG. 3 is a flow diagram that describes steps in a method in accordance with one or more embodiments. Step 300 receives social media information that includes topic information and location information correlated with the topic information. For instance, correlations between topic information and sentiment information identified accordingly to the method discussed above can be received, e.g., by the computing device 102.

Step 302 generates a map interface that includes one or more locations identified by the location information. Examples of a map interface are discussed below.

Step 304 populates the map interface with indicia of the topic information. For instance, the keywords from the topic information can be overlaid over a map of a geographical region included as part of the map interface. Examples implementations of populating a map interface are discussed below.

Figure 4:
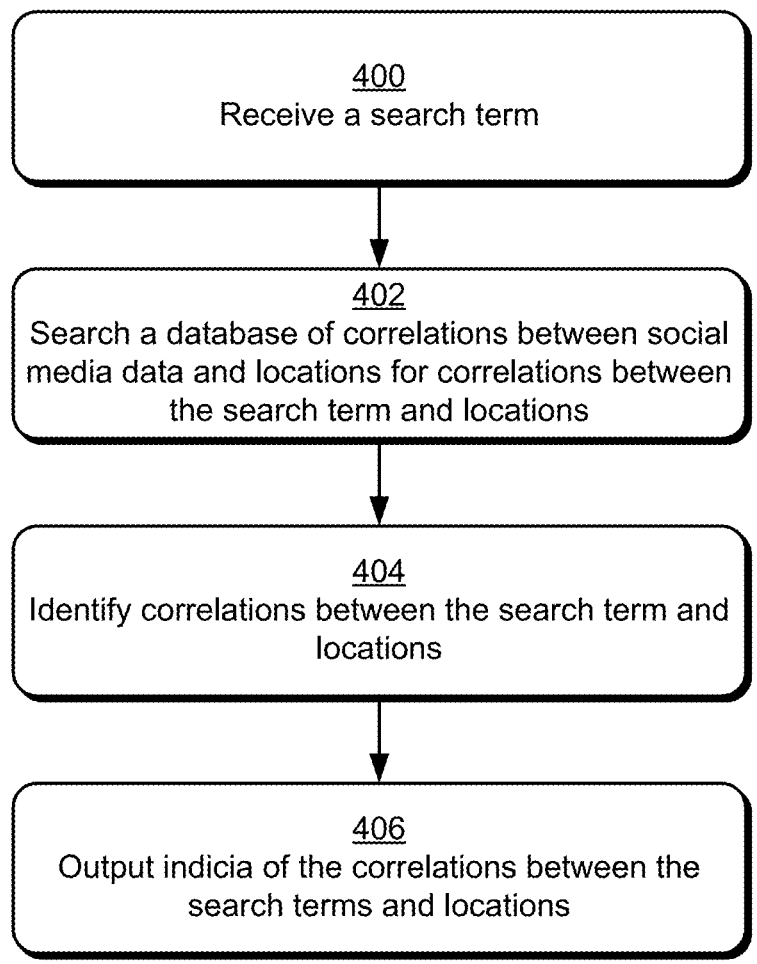
FIG. 4 is a flow diagram that describes steps in a method in accordance with one or more embodiments.

FIG. 4 is a flow diagram that describes steps in a method in accordance with one or more embodiments. In at least some implementations, the method describes an example technique for visual indicia of correlations between various types of social media information.

Step 400 receives a search term. For instance, a user can input the search term via a graphical user interface. The search term can include a particular topic, sentiment indicia, and/or a location identifier. For example, the search term can be "like skiing."

Step 402 searches a database of correlations between social media data and locations for correlations between the search term and locations. For example, a database constructed accordingly to the process(es) discussed above can be searched with the search term.

Step 404 identifies correlations between the search term and locations. Geographical regions in which interest has been detected for topics included in the search term can be identified, for example.

Step 406 outputs indicia of the correlations between the search terms and locations. For instance, various graphical representations of the correlations can be output, as discussed elsewhere herein.

Figure 5:
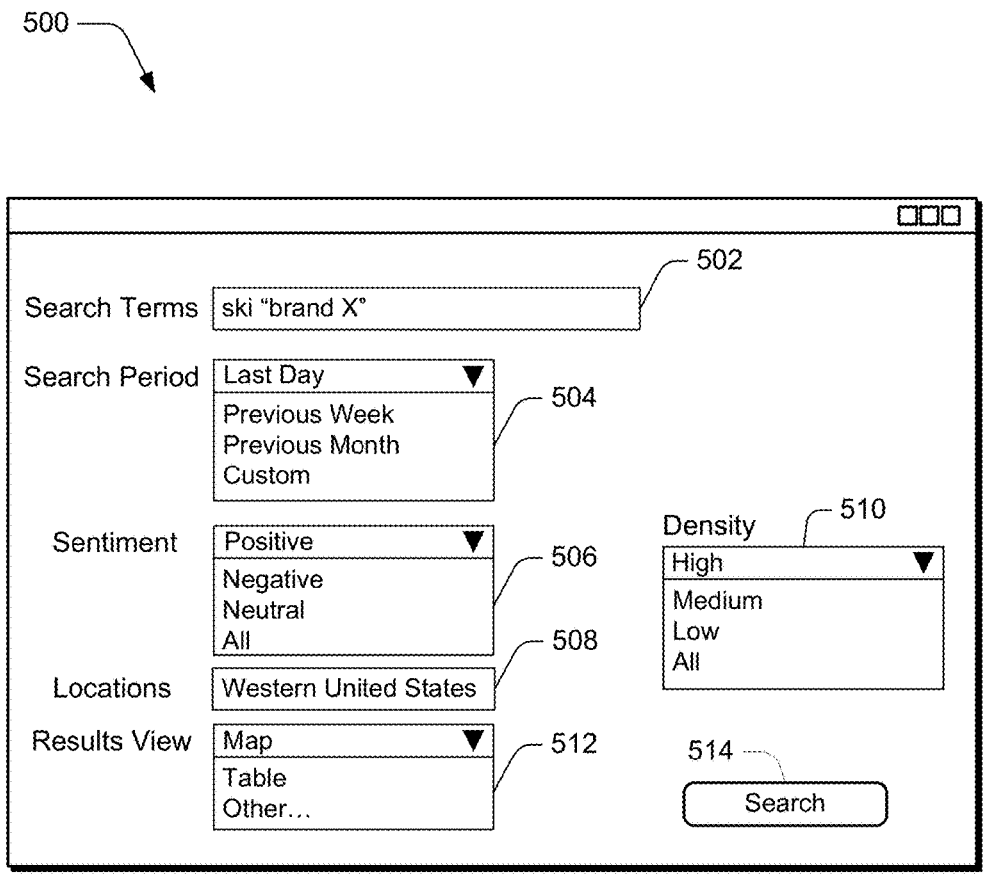
FIG. 5 illustrates an example graphical user interface in accordance with one or more embodiments.

FIG. 5 illustrates an example graphical user interface (GUI) 500 that can be employed to initiate a search for correlations between social media data and locations. The GUI 500 includes a variety of menus and/or fields that can receive user input to provide search parameters. For instance, the GUI 500 includes a search terms field 502, in which a user can input various terms to be used to search social media data. In this particular example, a user inputs the terms "ski" and "brand X," a particular brand of skis.

The GUI 500 further includes a search period menu 504, which enables a user to set different search periods for searching for social media data. For instance, a user can specify a search for social media data that was posted during a previous day (e.g., last 24 hours), a previous week, a previous month, and so on. A user may also specify a custom search period, such as by selecting a specific calendar day, week, month, and so on.

A sentiment menu 506 is illustrated, which enables a user to select particular sentiment values to be used in searching social media data. For example, a user can request a search for social media data with positive sentiment, negative sentiment, neutral sentiment (e.g., no detected positive or negative sentiment), or all sentiment values.

Further included is a locations menu 508, which enables a user to specify social media data associated with particular locations. Various location-related data can be provided in the locations menu 508, such as geographic locations, e.g., countries, states, cities, regions, and so on. Destination locations may also be input, such as a particular restaurant, museum, resort, theater, and so forth. Geographical coordinates may also be input to the locations menu 508, such as GPS coordinates, latitude values, longitude values, and so on. Thus, location information provided to the locations menu 508 can be used to narrow a search of social media data to a particular location and/or geographical region.

The GUI 500 also includes a density menu 510, which enables a user to specify a search hit density for search terms provided in the search terms field 502. Generally, search hit density refers to a number of search term hits as compared to a total volume of social media data searched. By specifying a search hit density, a user can filter a search to only return hits that meet the specified density. For instance, each specified density can correspond to a particular range of search hit percentage. A high density, for instance, can indicate that more than 50% of the social media data searched (e.g., posts) included one or more of the search terms. A medium density can indicate a range of 10%-50%, and a low density can indicate less than 10%. By selecting "All", a user can specify that a search is not to be limited based on search hit density, e.g., all search results are to be returned regardless of hit density.

A results view menu 512 enables a user to select a visual form in which search results are to be returned. As illustrated elsewhere herein, a map view can present a map of a particular location with search results from the location overlaid on the map. The location, for instance, can correspond to a location specified in the locations menu 508. A table view can return search results in the form of a table that specifies correspondence between search results and various other attributes. These search result visualizations are presented for purpose of example only, and a wide variety of other types of visualizations may be employed within the spirit and scope of the claimed embodiments.

The GUI 500 further includes a search button 514, which can be selected to initiate a search of social media data based on the various search parameters provided to the GUI 500.

Figure 6:
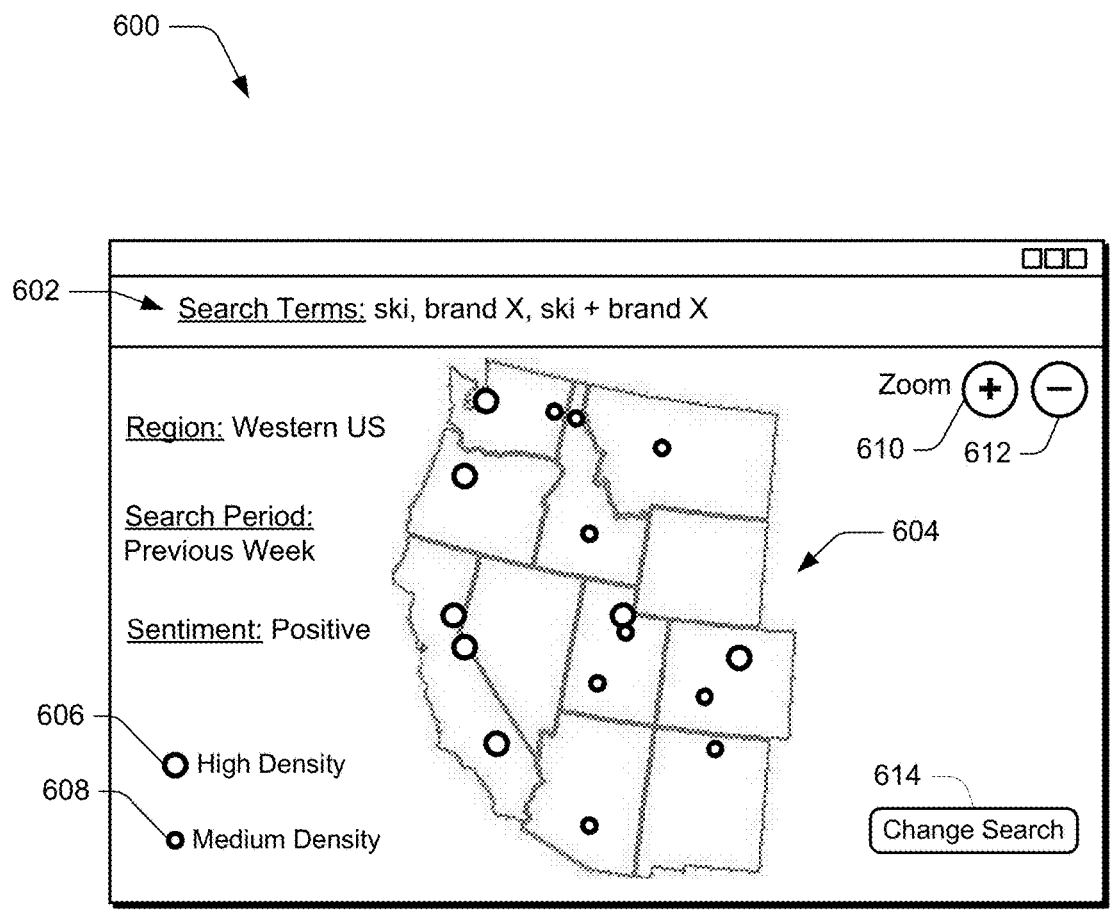
FIG. 6 illustrates an example graphical user interface in accordance with one or more embodiments.

FIG. 6 illustrates an example graphical user interface (GUI) 600 that can be employed to output search results from a search of social media data. For instance, the GUI 600 can be output based on search criteria provided to the GUI 500, and in response to selection of the search button 514.

The GUI 600 includes a search terms region 602, which displays search terms that are represented in the search results of the GUI 600. Further included is a results region 604, which displays visual indicia of social media data search results. In this example, the results region 604 includes a map of the Western United States. For example, the map can be provided based on the particular search location indicated in the locations menu 508.

Also included in the results region 604 and overlaid over the map are visual indicia of locations in which hits for search results occur. For instance, a visual indicium 606 indicates areas of high search hit density, and a visual indicium 608 indicates areas of medium search hit density. Thus, the map is overlaid with the different visual indicia to indicate regions of high search hit density, and medium search hit density.

Further included are a zoom-in control 610 and a zoom-out control 612. The zoom-in control 610 can be selected to visually zoom-in on portions of the results region 604, such as to provide a more detailed view of search results. The zoom-out control 612 can be selected to provide a broader view of search results, such as to increase amount of geographic area included in a search.

In at least some embodiments, selection of a zoom control can cause a search of social media data to be reinitiated. For example, selecting the zoom-in control 610 can cause a search (e.g., based on search criteria provided to the GUI 500) to be performed again and focused on a region to which the results region 604 is zoomed. Selecting the zoom-out control 612 can cause a search to be performed again for a larger region, such as a wider expanse of geographical area that is displayed as a result of a zoom-out operation.

The GUI 600 further includes a change search control 614, which can be selected to change various search parameters. Selection of the change search control 614, for example, can cause the GUI 500 to be displayed such that search criteria can be specified and/or changed.

Figure 7:
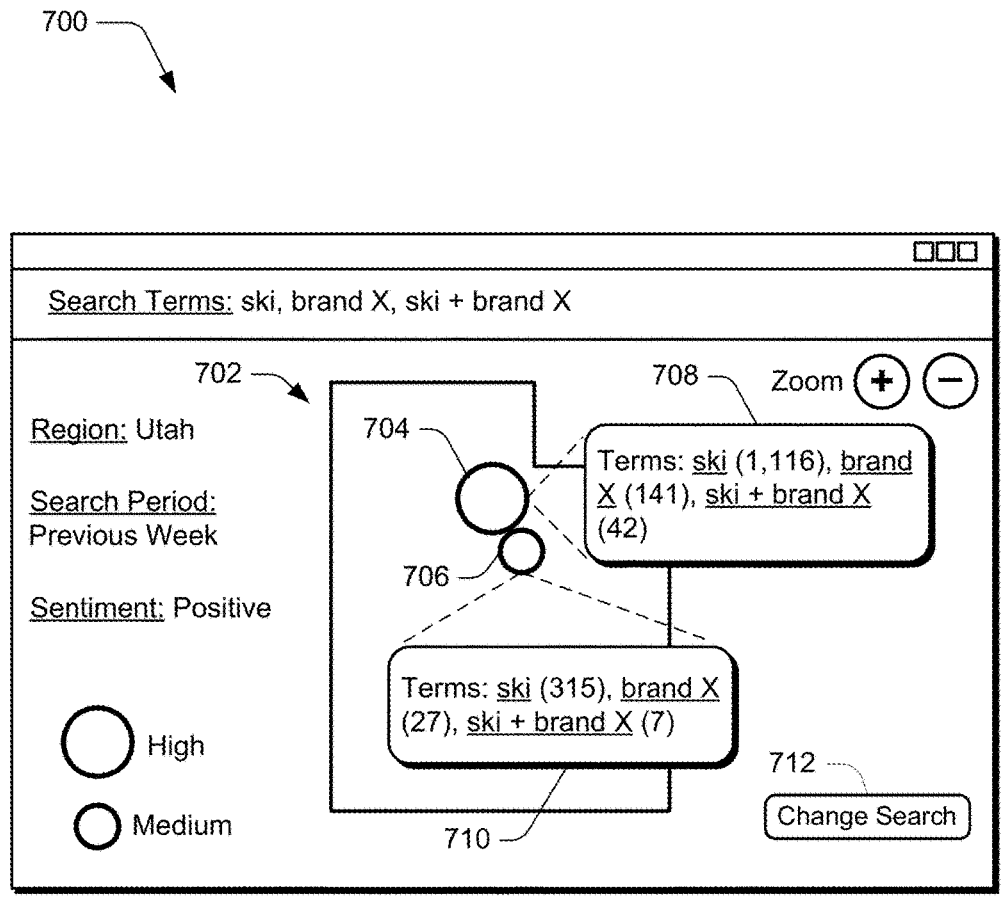
FIG. 7 illustrates an example graphical user interface in accordance with one or more embodiments.

FIG. 7 illustrates an example graphical user interface (GUI) 700 that can be employed to output search results from a search of social media data. For instance, the GUI 700 can be output based on search criteria provided to the GUI 500, and in response to selection of the search button 514. Alternatively or additionally, the GUI 700 can be output in response to selection of a zoom control, such as the zoom-in control 610 and/or the zoom-out control 612.

The GUI 700 includes a results region 702, which displays results of a search of social media data. In at least some implementations, the results region 702 can display a zoomed-in portion of a region that is searched for social media data, such as in response to a zoom on the results region 604 of the GUI 600. In this example, the results region includes a map of the state of Utah. Overlaid on the map are a visual indicium 704 and a visual indicium 706, which indicate areas on the map that correspond to hits for search results. The visual indicia, for example, correspond to geographic sub-regions of the map, such as cities, counties, demographic regions, and so forth.

Further illustrated are a detail window 708 and a detail window 710, which include details about specific search areas. For example, the detail window 708 includes details about search results for a region indicated by the visual indicium 704. The detail window 708 includes search terms and a number of hits for the search terms in the region associated with the visual indicium 704. Further, the detail window 710 includes search terms and a number of hits for the search terms in the region associated with the visual indicium 706.

In at least some implementations, the visual indicium 704 and/or the visual indicium 706 are selectable to cause further information to be displayed. For instance, selection of the visual indicia can cause geographic information for an associated region to be displayed. Such geographic information can include a city name, county name, GPS coordinates that define the region, zip codes included in the region, and so on.

The GUI 700 further includes a change search control 712, which can be selected to change various search parameters. Selection of the change search control 712, for example, can cause the GUI 500 to be displayed such that search criteria can be specified and/or changed.

Figure 8:
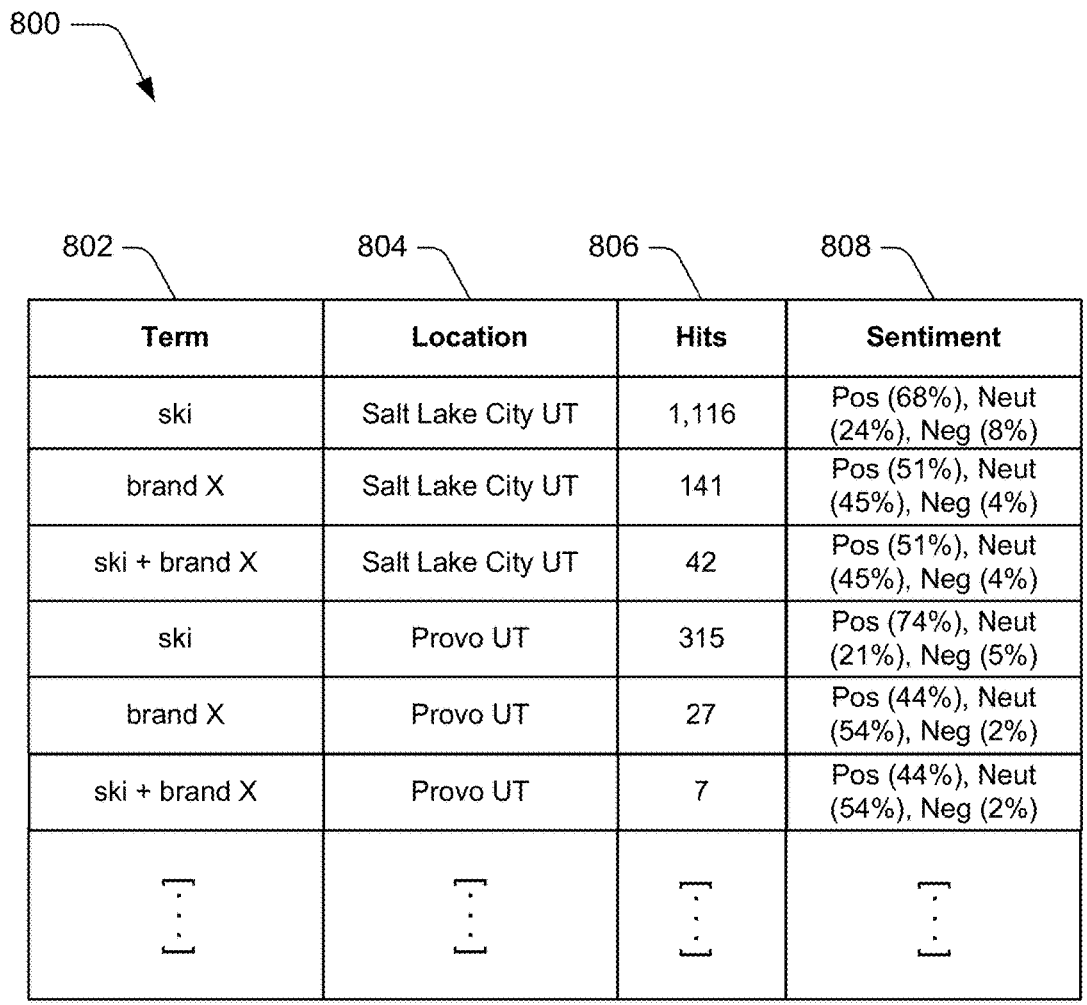
FIG. 8 illustrates an example search results table in accordance with one or more embodiments.

FIG. 8 illustrates a table 800 that includes results from a search of social media data. The table 800, for example, can be displayed based on a user selection of the "table" option from the GUI 500. Alternatively or additionally, the table 800 represents a data structure that can be stored and accessed to retrieve search results.

Included as part of the table 800 are several columns that include information concerning results of a search of social media data. A terms column 802 includes search terms that are used to conduct a search of social media data, and a location column 804 identifies particular locations that are searched. Although city names are indicated in this example, the location column 804 can include other types of location information, such as GPS coordinates, names of geographic locations (e.g., country identifiers), zip codes, and so on.

The table 800 further includes a hits column 806, which indicates a number of search hits for a particular search term indicated in the terms column 802 and in a particular location indicated in the location column 804. A sentiment column 808 indicates proportions of the search hits associated with a particular sentiment.

The aspects of the various implementation scenarios discussed above can be employed to determine demographic information for different locations, such as for targeted advertising, marketing, and so on. This is not limiting on the claimed subject matter, however, and information gleaned according to techniques discussed herein can be leveraged for a variety of different purposes.

Having discussed some example implementation scenarios, consider now a discussion of some example embodiments for social media monitoring.

Social Media Monitoring

In at least some embodiments, social media information can be monitored for certain specified criteria, and alerts can be generated when specified criteria are detected. Further to such embodiments, consider the following example implementations.

Figure 9:
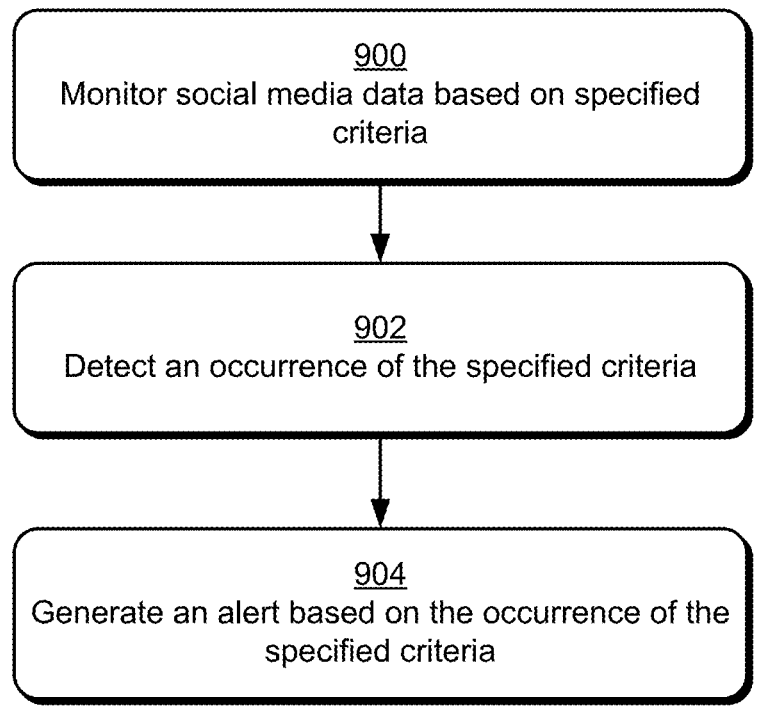
FIG. 9 is a flow diagram that describes steps in a method in accordance with one or more embodiments.

FIG. 9 is a flow diagram that describes steps in a method in accordance with one or more embodiments. Step 900 monitors social media data based on specified criteria. Examples of criteria include keywords, sentiment data, search hit density, and so forth. Criteria may also be region specific, such as social media data determined to originate from and/or target a particular geographic region. Further, various combinations of criteria may be specified to create a custom monitoring scenario.

Step 902 detects an occurrence of the specified criteria. For example, an occurrence of a particular keyword and/or combination of keywords can be detected. Sentiment data associated with a particular keyword or combination of keywords may also be detected, such as positive sentiment, negative sentiment, and so forth.

Another example of such an occurrence is a search of social media data indicating a particular hit density for a particular keyword, sentiment data, and so forth. For instance, a threshold hit density can be specified, such as in terms of a particular percentage. If a search of social media data falls below, meets, or exceeds the particular percentage for the specified criteria (e.g., in a particular region), an occurrence of the specified criteria can be indicated.

Step 904 generates an alert based on the occurrence of the specified criteria. For instance, a notification pop-up window can be displayed that includes a visual indication of the occurrence. Other types of alerts may also be employed, such as an email alert, a short message service (SMS) alert, an instant messaging (IM) alert, and so on.

As a further example, one or more of the GUI 600, GUI 700, and/or the table 800 can be automatically generated and displayed based on the occurrence of the specified criteria. The GUI and/or table can identify a specified region and the specified criteria, such as keywords, sentiment data, search hit density, search period, and so forth.

In at least some implementations, the steps of the method described above can be implemented without user interaction, e.g., as an automated process that automatically monitor social media information for various criteria, and automatically generates alerts when various criteria are met.

Figure 10:
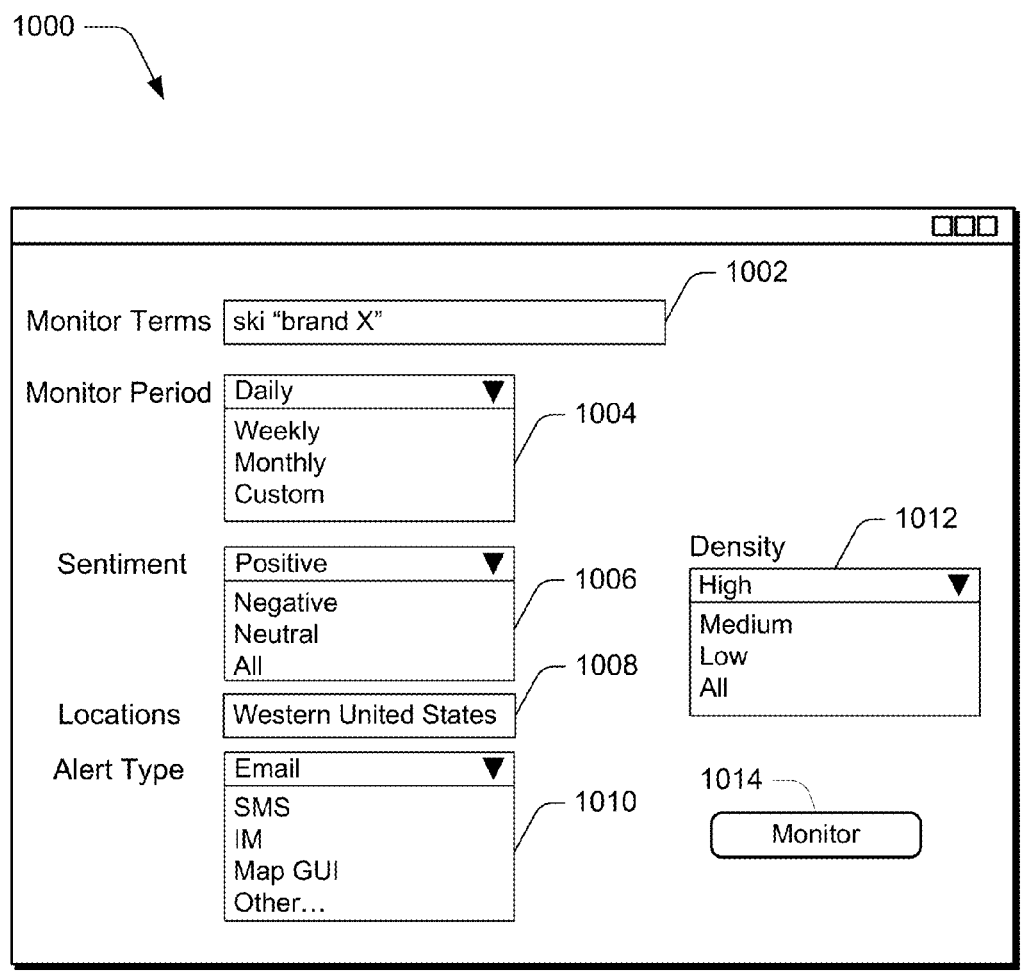
FIG. 10 illustrates an example graphical user interface in accordance with one or more embodiments.

FIG. 10 illustrates an example graphical user interface (GUI) 1000 that can be employed to configure monitoring of social media data. The GUI 1000 includes several fields and menus that can be utilized to specify monitoring criteria, such as via user input to the GUI 1000. For instance, a terms field 1002 can be used to specify keywords, phrases, and so forth, that can be used to construct search criteria. A period field 1004 can be used to specify a time period over which social media information is to be monitored. For instance, social media information can be accumulated daily (e.g. over a 24 hour period), weekly, monthly, and so forth. A custom monitoring period may also be specified, such as a particular calendar day, week, month, and so forth.

A sentiment field 1006 can be used to specify a particular sentiment for social media information monitoring. Input to a locations field 1008 can specify a particular region and/or location associated with social media information to be monitored.

An alert field 1010 enables an alert type to be specified for indicating that monitoring criteria have been met. The listed alert types are presented for purpose of example only, and a variety of different alert types may be employed in accordance with the claimed embodiments.

A density field 1012 is illustrated, which enables a particular monitoring hit density to be specified. For example, different hit densities can be associated with different percentages of social media information (e.g., posts) from which other monitoring criteria are detected.

The GUI 1000 includes a monitor control 1014, which is selectable to initiate monitoring according to other criteria provided to the GUI 1000. For example, selecting the monitor control 1014 can initiate an automatic monitoring process (e.g., as described with reference to FIG. 9), which can monitor social media information and generate alerts independent of user interaction.

Having discussed some example implementation scenarios, consider now a discussion of an example system and device in accordance with one or more embodiments.

Example System and Device

Figure 11:
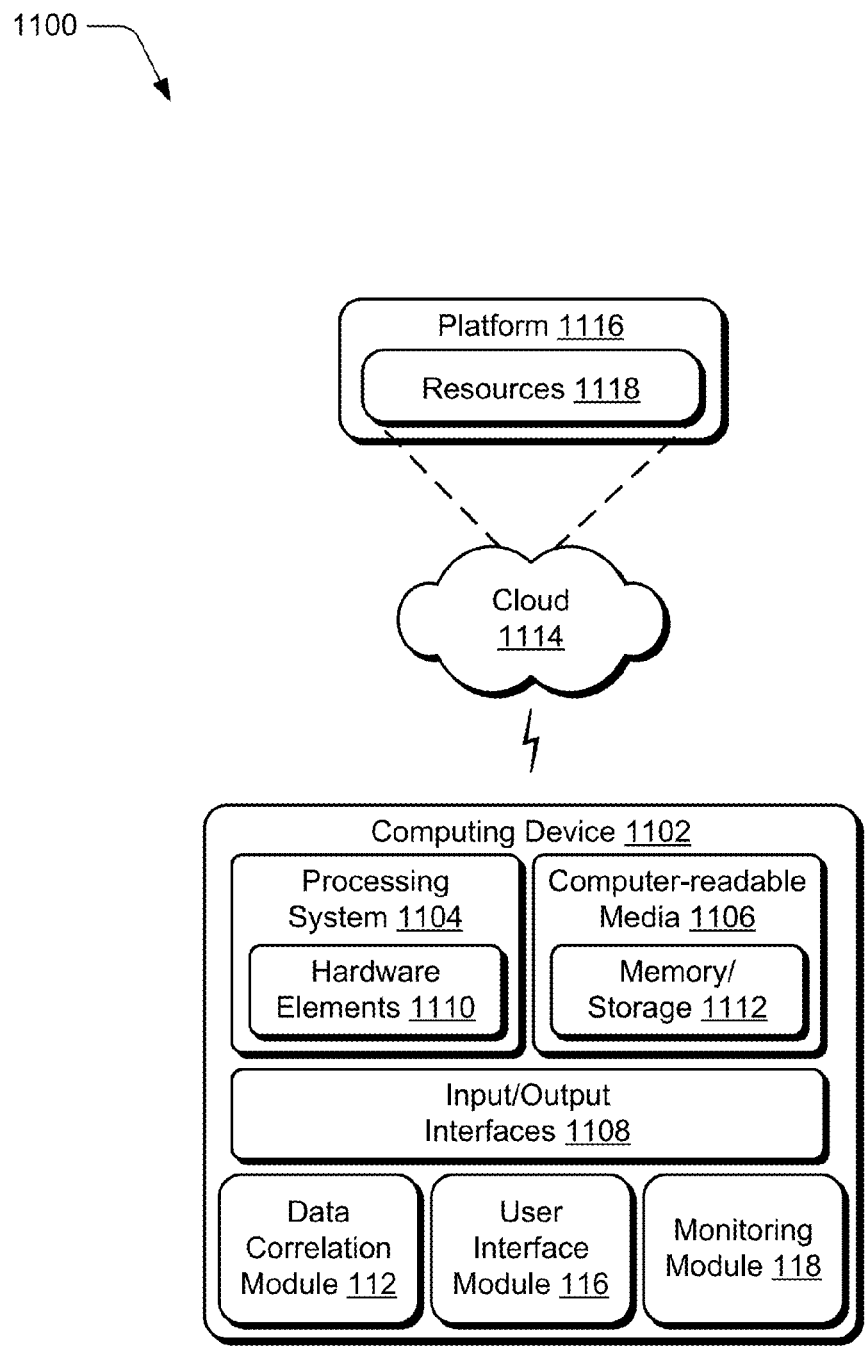
FIG. 11 illustrates an example system and computing device as described with reference to FIG. 1, which are configured to implement embodiments of techniques described herein.

FIG. 11 illustrates an example system generally at 1100 that includes an example computing device 1102 that is representative of one or more computing systems and/or devices that may implement the various techniques described herein. This is illustrated through inclusion of the data correlation module 112, the user interface module 116, and the monitoring module 118, which may be employed to implement techniques for correlating social media data with location information discussed herein. The computing device 1102 may be, for example, a server of a service provider, a device associated with a client (e.g., a client device), an on-chip system, and/or any other suitable computing device or computing system. In at least some implementations, the computing device 1102 represents an example embodiment of the computing device 102 of environment 100.

The computing device 1102 as illustrated includes a processing system 1104, one or more computer-readable media 1106, and one or more I/O interfaces 1108 that are communicatively coupled and/or connected, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware elements 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1106 are illustrated as including memory/storage 1112. The memory/storage 1112 represents memory/storage capacity associated with one or more computer-readable media. The memory/storage 1112 may include volatile media (such as random access memory (RAM)) and/or nonvolatile media (such as read only memory (ROM), Flash memory, optical disks, magnetic disks, and so forth). The memory/storage 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" refer to media and/or devices that enable persistent storage of information in contrast to mere signal transmission, carrier waves, or signals per se. Thus, computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100, the system 1100, and so on.

Conclusion

Techniques for correlating social media data with location information are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method, comprising:
   receiving social media data that includes topic information included in the social media data, sentiment values for at least some of the topic information, and location information correlated with the topic information;
   receiving user selection of a search term, a search term density value, and a sentiment density value for a particular sentiment value;
   comparing, for locations identified in the location information, a number of occurrences of the search term to a total volume of social media data received to determine a density of the search term at each of the locations;
   filtering the social media data to identify a set of locations that meet the user selected search term density value;
   filtering the set of locations to identify a subset of locations that meet the user selected sentiment density value for the particular sentiment value; and
   populating a map interface with indicia of the search term such that the search term is visually associated with the subset of locations, the indicia of the search term indicating one or more particular locations where the determined density of the particular sentiment value for the search term meets the user selected density value for the particular sentiment value.

2. A computer-implemented method as recited in claim 1, wherein the social media data comprises one or more of social media posts or content posted to a social media platform.

3. A computer-implemented method as recited in claim 1, wherein the topic information comprises one or more of keywords or content identifiers from the social media data.

4. A computer-implemented method as recited in claim 1, wherein the indicia of the topic information are overlaid on geographic regions of the map interface that correspond to the locations identified by the location information.

5. A computer-implemented method as recited in claim 1, further comprising:
   receiving an indication of a change to the search term one or more search terms used to populate the map interface with the indicia of the topic information; and
   causing one or more changes to the map interface based on the change to the search term one or more search terms.

6. A computer-implemented method as recited in claim 1, wherein said generating comparing and said populating occur in response to a user-initiated search of the social media data.

7. A computer-implemented method as recited in claim 6, wherein said user-initiated search includes input to a search graphical user interface that enables a user to specify search parameters for searching the social media data.

8. One or more computer-readable storage media comprising instructions stored thereon that, responsive to execution by a computing device, cause the computing device to perform operations comprising:
   receiving social media data that includes topic information included in the social media data, sentiment values for at least some of the topic information, and location information correlated with the topic information;

receiving user selection of a search term, a search term density value, and a sentiment density value for a particular sentiment value;

comparing, for locations identified in the location information, a number of occurrences of the search term to a total volume of social media data received to determine a density of the search term at each of the locations;

filtering the social media data to identify a set of locations that meet the user selected search term density value;

filtering the set of locations to identify a subset of locations that meet the user selected sentiment density value for the particular sentiment value; and populating a map interface with indicia of the search term such that the search term is visually associated with the subset of locations, the indicia of the search term indicating one or more particular locations where the determined density of the particular sentiment value for the search term meets the user selected density value for the particular sentiment value.

9. One or more computer-readable storage media as recited in claim 8, wherein the social media data comprises one or more of social media posts or content posted to a social media platform.

10. One or more computer-readable storage media as recited in claim 8, wherein the topic information comprises one or more of keywords or content identifiers from the social media data.

11. One or more computer-readable storage media as recited in claim 8, wherein the indicia of the topic information are overlaid on geographic regions of the map interface that correspond to the locations identified by the location information.

12. One or more computer-readable storage media as recited in claim 8, wherein the operations further include:
receiving an indication of a change to the search term; and
causing one or more changes to the map interface based on the change to the search term.

13. One or more computer-readable storage media as recited in claim 8, wherein said comparing and said populating occur in response to a user-initiated search of the social media data.

14. A system comprising:
one or more processors; and
one or more computer-readable storage media storing computer-executable instructions that, responsive to execution by the one or more processors, cause the system to perform operations including:

receiving social media data that includes topic information included in the social media data, sentiment values for at least some of the topic information, and location information correlated with the topic information;

receiving user selection of a search term, a search term density value, and a sentiment density value for a particular sentiment value;

comparing, for locations identified in the location information, a number of occurrences of the search term to a total volume of social media data received to determine a density of the search term at each of the locations;

filtering the social media data to identify a set of locations that meet the user selected search term density value;

filtering the set of locations to identify a subset of locations that meet the user selected sentiment density value for the particular sentiment value; and populating a map interface with indicia of the search term such that the search term is visually associated with the subset of locations, the indicia of the search term indicating one or more particular locations where the determined density of the particular sentiment value for the search term meets the user selected density value for the particular sentiment value.

15. A system as recited in claim 14, wherein the social media data comprises one or more of social media posts or content posted to a social media platform.

16. A system as recited in claim 14, wherein the topic information comprises one or more of keywords or content identifiers from the social media data.

17. A system as recited in claim 14, wherein the indicia of the topic information are overlaid on geographic regions of the map interface that correspond to the locations identified by the location information.

18. A system as recited in claim 14, wherein the operations further include:
receiving an indication of a change to the search term; and
causing one or more changes to the map interface based on the change to the search term.

19. A system as recited in claim 14, wherein said comparing and said populating occur in response to a user-initiated search of the social media data.

20. A system as recited in claim 19, wherein said user-initiated search includes input to a search graphical user interface that enables a user to specify search parameters for searching the social media data.

* * * * *